May 1, 1962 B. S. HEGG ETAL 3,031,840
COORDINATED FUEL FEED AND EXHAUST JET AREA
CONTROL WITH TEMPERATURE OVERRIDE
Original Filed Feb. 24, 1951 4 Sheets-Sheet 1

INVENTORS.
BILLY S. HEGG
NORMAN K. PETERS
BY
ATTORNEY

United States Patent Office 3,031,840
Patented May 1, 1962

3,031,840
COORDINATED FUEL FEED AND EXHAUST JET AREA CONTROL WITH TEMPERATURE OVERRIDE
Billy S. Hegg and Norman K. Peters, South Bend, Ind., assignors to The Bendix Corporation, a corporation of Delaware
Continuation of abandoned applications Ser. No. 454,348, Sept. 7, 1954, which is a continuation of Ser. No. 212,566, Feb. 24, 1951. This application Mar. 31, 1960, Ser. No. 19,117
17 Claims. (Cl. 60—35.6)

This application is a continuation of my copending application Serial No. 454,348, filed September 7, 1954, now abandoned, covering a coordinated fuel feed and exhaust area control for jet engines which in turn is a continuation of my application Serial No. 212,566, filed February 24, 1951, now abandoned, also covering a coordinated fuel feed and exhaust area control.

The instant invention relates to controls for turbojet engines, and particularly to controls of that type wherein the rate of fuel feed and the area of the exhaust jet or nozzle are coordinated over a predetermined portion of the power range subject to the action of an override device responsive to temperature, speed or other operating conditions or parameter. An example of such a control is illustrated in the copending application of Frank C. Mock, Serial No. 511,077, filed May 25, 1955, now U.S. Patent 2,958,186 which is a continuation of now abandoned application Serial No. 156,980, filed April 20, 1950 (common assignee).

An object of the instant invention is to provide control mechanism of the type specified which may be readily adapted to certain desired conditions of engine operation. Thus, in the example illustrated, the improved control will automatically maintain the exhaust jet or nozzle at maximum area at power lever positions and engine speeds below predetermined values; at power lever positions and engine speeds above such values and at tailpipe temperatures below a predetermined value, the exhaust jet area will vary in response to adjustment of said lever. In the event the tailpipe temperature rises beyond the set or predetermined temperature, with the exhaust jet or nozzle at any area less than maximum, the power lever control will be overriden and the exhaust jet area will be automatically increased until the tailpipe temperature drops to a safe value. Should the pilot attempt to reduce the area of the exhaust jet to a value which will produce excessive tailpipe temperatures, the power lever control will again be overriden and jet nozzle area will vary as a function of tailpipe temperature only.

Another object is to coordinate a hydraulic and electric control for the exhaust jet area of a turbojet engine.

A further object is to improve the control mechanism disclosed in the application of Frank C. Mock, above noted.

The foregoing and other objects and advantages will become apparent in view of the following description taken in conjunction with the drawings, wherein.

Figure 1:
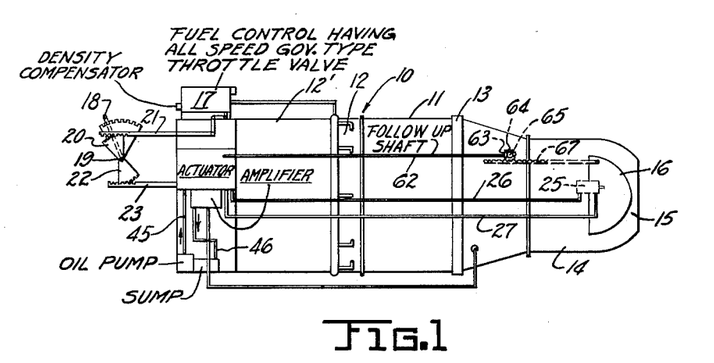
FIGURE 1 is a view, principally in elevation, of a turbojet engine having operatively associated therewith a control embodying the features of the instant invention.

Referring to FIGURE 1, a turbojet engine is shown more or less diagrammatically at 10; it includes a burner section 11, an air adapter or header section 12 detachably connected to the front end of the burner section and adapted to direct air under pressure from an axial flow compressor 12' to the burners, where the air mixes with the fuel discharged from the burner nozzles to promote combustion, the expanded air and products of combustion being discharged through a turbine section 13, tailpipe 14 and a reaction jet or exhaust nozzle 15. The area of the exhaust jet is variable by suitable means such as a bullet valve or cone 16, mounted to move inwardly and outwardly of the exhaust jet in suitable guides, not shown.

Fuel is supplied to the burner system by a suitable fuel control device generally indicated at 17, which may be of the type disclosed in the copending application of Frank C. Mock, above noted, wherein the engine speed as selected by the pilot is automatically maintained by an engine driven all-speed governor at all altitudes irrespective of changes in the pressure and/or temperature of the air flowing to the engine. A pilot actuated power control lever is indicated at 18; it is secured on a shaft 19 and the latter is operatively connected to the governor valve of the fuel control unit 17 through a gear 20 and rack 21. Also secured on shaft 19 is a gear 22 in mesh with a rack 23, which projects into the hydraulic actuator for a purpose to be described.

Figure 2:
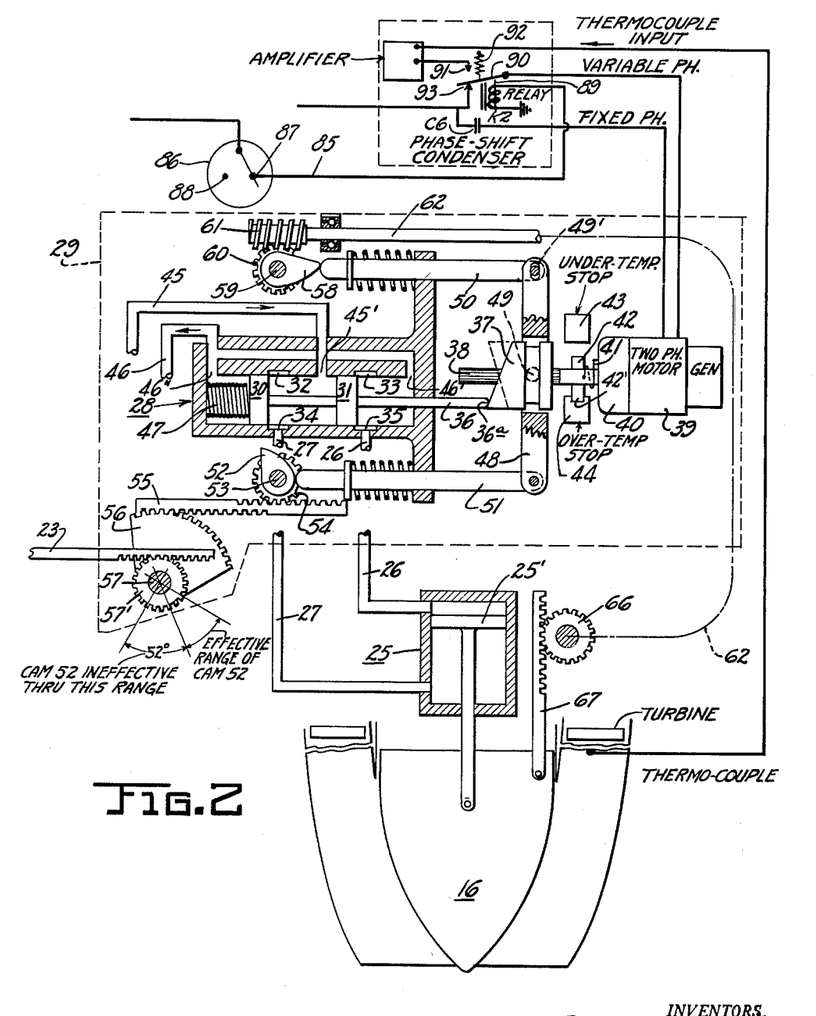
FIGURE 2 is a sectional schematic view of the hydraulic actuator for the jet nozzle area varying valve or bullet.

The bullet valve or cone 16 is repositioned or reset by means of a hydraulic servomotor generally indicated at 25 and having mounted therein a servo piston 25', note FIGURE 2. High pressure oil or hydraulic fluid is conducted to the cylinder 25 on opposite sides of piston 25' by way of high pressure oil lines 26 and 27, which lead from a servo valve 28 located in the housing 29 of the actuator mechanism. The servo valve 28 (FIGURE 2) comprises a suitable cylinder having slidably mounted therein a pair of valve pistons 30 and 31, which control the exhaust areas to the annular lands or recesses 32 and 33, from which ports 34 and 35 lead to the oil lines 27 and 26. The valve pistons 30 and 31 are carried by a slide rod 36, which constitutes a cam follower and has a cam surface 36a at its free end engaging the active surface of a motor driven cam 37, splined for limited longitudinal sliding movement on a shaft 38, adapted to be driven by a motor 39 through a gear reduction unit 40, the said motor being a two-phase servomotor controlled in a manner to be described. When the power is off, a spring 41 returns or rotates the motor or armature shaft 38 back to a position where the one end 42' of a stop arm 42 carried by the shaft engages an undertemperature stop 42. In actual practice, the spring 41 is located on the gear reduction unit 40 and the latter drives cam 37 through an additional reduction unit, but for purpose of illustration, the said spring is shown in the open surrounding the shaft 38. An overtemperature stop 44 is also adapted to be engaged by the end 42' of arm 42 under certain conditions of operation, to be described.

Hydraulic fluid such as oil under pressure is conducted to the servo valve 28 through oil line or conduit 45 and port 45', and exhausted or drained therefrom by way of exhaust ports 46' and 46", and oil line or conduit 46. A spring 47 normally urges the cam end 36a of the piston or follower rod 36 against the active surface of the cam 37.

The cam 37 is actuated axially on the splined portion of the shaft 38 by means of a link bar 48, which is pivotally connected at 49 to said cam, the bar 48 having a pivot and slot connection 49' at one end to a slidable rod or cam follower 50 and at its opposite end being pivoted to a similar rod or follower 51.

A throttle cam 52 is secured on a shaft 53, which is rotated by means of a pinion 54, adapted to engage a rack bar 55, the latter having teeth in mesh with those of a segmental gear 56, secured on a shaft 57. Also secured on the latter shaft is a pinion 57' having teeth in mesh with those of the rack bar 23 and which is actuated in response to adjustment of the pilot's control lever 21, FIGURE 1. The cam 52, when rotated, actuates the follower rod 51.

The follower rod 50 is actuated by means of a follow-up cam 58, which is secured on a shaft 59. Also secured on the same shaft is a pinion 60, the teeth of which are in mesh with those of a worm 61, secured on the one end of a follow-up shaft 62, the latter extending back to the tailpipe section and at its opposite end being provided with a bevel gear 63, note FIGURE 1, in mesh with a similar gear 64, secured on the adjacent end of a shaft 65. Shaft 65 projects through and has bearing in the wall of the tailpipe and at its inner end has secured thereon a pinion 66, the teeth of which are in mesh with those of a rack gear 67, connected to the bullet valve 16, note FIGURE 2.

Preferably, the contour of cam 52 is such that it is ineffective to move the servo valve follower rod 51 through the idle range of adjustment of the pilot's control lever 18 and which, it will be assumed for the purposes of illustration, is 52°. Above that range, or throughout the power range, the cam 52 acts to reset cam 37 longitudinally on the shaft 38; and it will be seen that the effective position of the follower rod 36 is also governed by the angular position of cam 37, which is a function of engine or turbine temperature and is capable of overriding the power lever or throttle control.

The follow-up cam 58 is preferably contoured in a manner such that the movement of the bullet or cone-shaped area valve 16, as sensed by follow-up cam 58 through its interconnecting linkage, will result in a substantially straight line thrust vs. throttle angle relationship.

Figure 3:
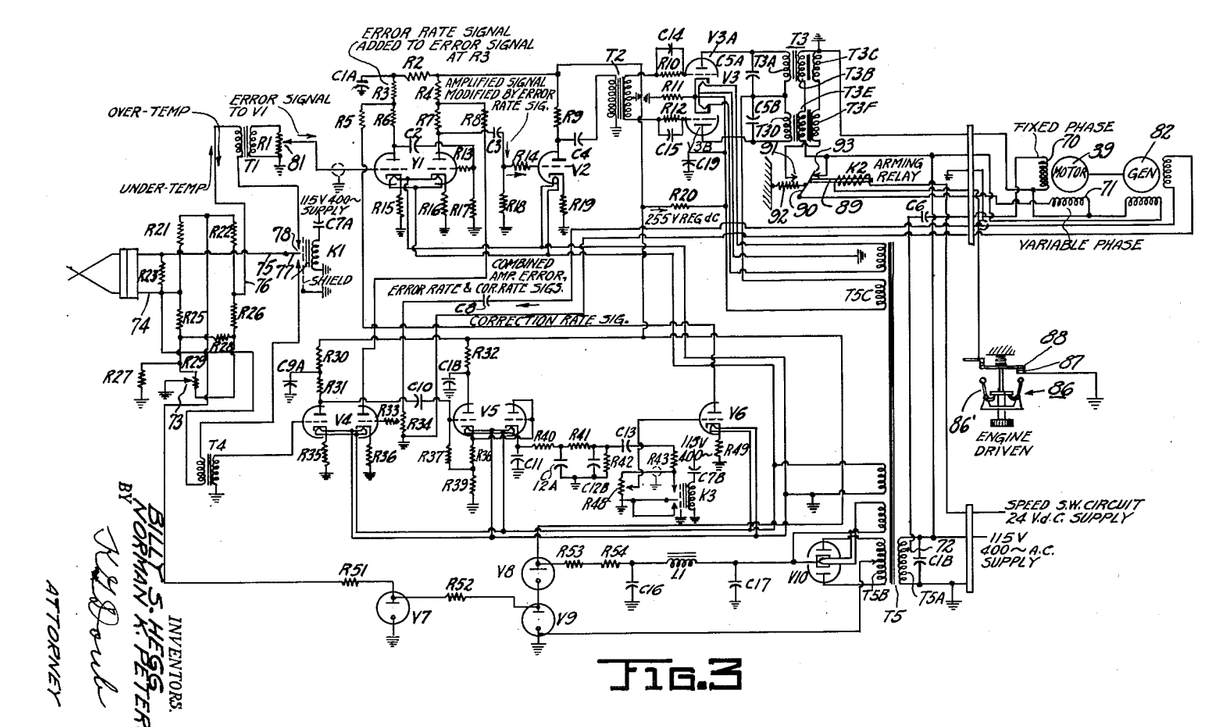
FIGURE 3 is a wiring diagram of the electronic temperature responsive control and amplifier control for the hydraulic actuator.
Figure 4:
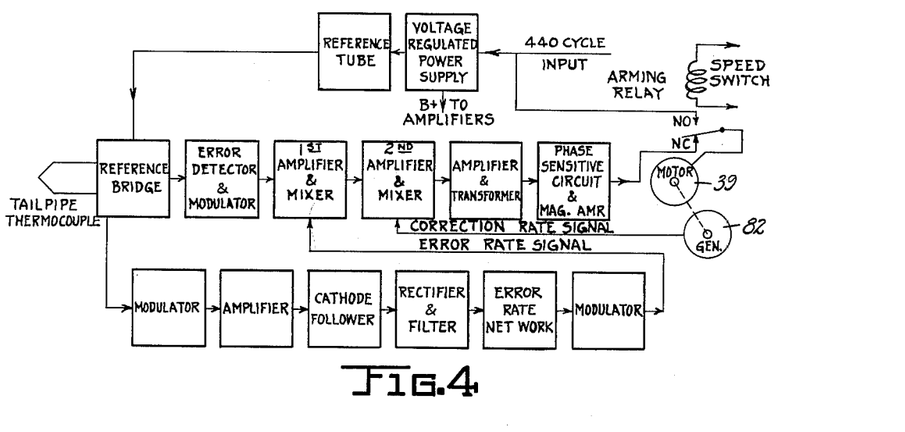
FIGURE 4 is a block diagram of the circuitry of FIGURE 3.

The motor 39 is controlled electronically as a function of engine temperature subject to modification as a function of engine speed by the circuit shown in FIGURES 3 and 4 and which will now be briefly described. In the wiring diagram of FIGURE 3, capacitors are commonly indicated by C; resistors by R; transformers by T; tubes by V; chokes by L; and choppers and relays by K.

At the right-hand side of FIGURE 3 the motor 39 is shown diagrammatically as having a pair of field windings 70 and 71, one (70) of which constitutes a fixed phase and the other (71) a variable phase winding. The winding 70 is connected in series with a capacitor C6 to a tap 72 on the primary of power transformer T5, which capacitor introduces a 90° phase shift between the fixed and variable phase windings required for maximum torque of motor 39. The primary T5A of T5 is supplied with a 400 cycle alternating current input from a suitable source, not shown. The high voltage mid-tapped secondary T5B of T5 is connected to the rectifier tube V10 in a full-wave rectifier circuit which changes the 400 cycle per second sine wave into a pulsating direct current with 800 positive peaks per second, which is smoothed by the low-pass filter circuit including C16, L1, C17, R53, R54 and voltage regulator tubes V8 and V9. The direct current supply, as regulated by tubes V8 and V9, aids in eliminating amplifier gain variations, and the effect thereof on control stability. The regulated voltage across V9 provides the required voltage for reference tube V7 and the dropping resistor R52. Tube V7 is preferably of the cold cathode glow discharge type designed for good voltage stability with a negligible temperature coefficient.

Figure 5:
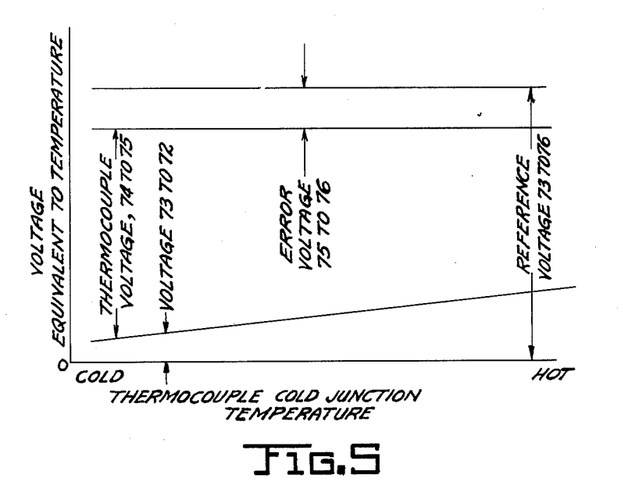
FIGURE 5 is a graph illustrating the operation of the bridge circuit of FIGURE 3.

The reference bridge circuit includes a network of precision wire wound resistors R21, R22, R25, R26, R28 and R29, which provide an accurate adjustable reference voltage for comparison with the voltage generated by the thermocouple and also provide for cold junction compensation. In explanation of "cold junction compensation": the voltage produced by a thermocouple is proportional to the difference between the hot and cold junction temperatures, yet the motor control amplifier is required to operate as a function of the hot junction temperature only. This requirement is met by R25, which is designed so that its resistance varies with changes in temperature and the voltage from 73 to 74 becomes a function of the thermocouple cold junction temperature. As the cold junction temperature increases, the voltage output of the thermocouple will decrease for a constant hot junction temperature, but the voltage across the temperature compensating resistor R25 will increase sufficiently to make the voltage from 73 to 75 independent of the cold junction temperature. This circuit operation is shown graphically in FIGURE 5. The magnitude of the error voltage developed between 76 and 75 is proportional to the temperature difference between the amplifier calibration (adjustment of R29) and the thermocouple hot junction temperature. The error voltage polarity is determined by the relative magnitudes of the two temperatures, vis. 75 is positive with respect to 76 for thermocouple temperatures greater than the calibration or set temperature and negative for temperatures lower than the calibration temperature. The resistors R23 and R27 have been added for "safe failure." Thus, should the thermocouple circuit open external to the amplifier or motor conrtol circuit, R23 completes the bridge circuit and maintains the equivalent of an undertemperature condition across the bridge. Under normal conditions, R23 has no effect on the bridge circuit. The resistor R27 simulates undertemperature operation should the wiper arm of potentiometer R29 open. In case of either failure, the motor control circuit will still "arm" the actuator control above the speed setting of the speed switch 86 but will not provide a safety override for the throttle control.

The error detector and modulator circuit includes transformer T1, mechanical modulator or chopper K1 and capacitor C7A; it develops a square wave voltage proportional to the error signal from the reference bridge and in phase or 180° out of phase with the 400 cycle supply, depending upon the error voltage polarity. The error voltage, i.e. the difference between the thermocouple and reference voltages, is modulated by the mechanical chopper K1 at the supply voltage frequency to permit the use of alternating current amplifiers. At tailpipe temperatures above or below the calibration temperature, current will flow in the primary of T1 whenever the circuit is completed through armature 77 and contact 78. The resultant output signal of T1 is a close approximation of a square wave with a magnitude proportional to the error voltage between 76 and 75. Overtemperatures cause current flow through the primary of T1 in one direction (down) and undertemperatures cause flow in the opposite direction (up), which results in a signal phase reversal. For example, if it is assumed that the chopper K1 and transformer T1 are connected to give a signal voltage at the secondary of T1 in phase with the 400 cycle supply voltage for temperatures above the calibration temperature, then the signal voltage will be 180° out of phase with the supply voltage for undertemperatures. The capacitor C7A produces a leading current which cancels the mechanical and inductive lag of the chopper to permit the signal to be in the desired phase relationship with the supply voltage.

A first stage amplifier and mixer circuit provides for the high amplification of the error signal and the insertion of the error rate signal; it includes a triode section of amplifier tube V1, amplifier tube V6 and potentiometer 81. The error signal is amplified by the one triode section of V1 and its associated resistors R6 and R15. Only the amplified signal appears across R17 since the direct current is blocked by capacitor C2. The error rate signal is added to the error signal at resistor R3, which is common to the amplifier circuits of both V1 and V6. R15 and R49 are large cathode resistors which produce sufficient individual stage degenerative feedback to permit tube interchangeability and plus or minus variation of about ten percent in the heater voltages with negligible amplifier gain variation. Resistor R2 and capacitor C1A comprise a decoupling filter network for reducing the power supply ripple across the V1 and V6 amplifier stages and minimizing regenerative feedback from the output stages.

A second stage amplifier and mixer circuit provides for the high amplification of the combined error signal and error rate signal with the correction rate signal; it includes the second section of tube V1, amplifier tube V4 and associated resistor including adjustable resistor or potentiometer R34, which latter permits adjustment of the correction rate signal magnitude, and the circuit is so designed as to permit such adjustment without affecting the amplification of the error and error rate signals. The resistors R13 and R33 limit the grid current drawn during the positive-going portion of large signals to prevent tube damage.

The combined error, error rate and correction rate signals are further amplified by the circuit including tube V2 and push-pull transformer T2, the latter having its primary capacitatively coupled to V2 and providing push-pull signals, viz. signal voltages 180° out of phase with one another, to the grids of the reactor driving tube sections of output tube V3.

The phase sensitive circuit and magnetic amplifier comprises the tube V3, the magnetic amplifier or saturable reactor T3, and associated capacitors C5A and C5B; its purpose is to convert the low power signal voltage of the signal amplifier circuit to a voltage with adequate power to energize one phase winding, the variable phase 70, of the servomotor 39. The other phase winding 71 is supplied with a fixed voltage through capacitor C6, which shifts the motor voltage approximately 90° to the supply voltage. The direction of rotation and torque of the two-phase servomotor, which has identical windings, are determined by the voltages applied to the windings and the phase relationship between the two applied voltages. With the voltage to the winding 70 constant, the supply to the other controls the torque and direction of motor rotation. The control voltage is proportional to the error voltage within the saturation limits of the amplifier, and the phase relationship to the supply voltage is determined by the polarity of the error voltage. The output tube V3 is biased to cut-off by the potential divider circuit which includes resistors R11 and R20 connected to the 255 volt regulated direct current line. With cut-off bias, the signal output of transformer T2 must reduce the negative voltage on a grid of V3 at the same instant the plate voltage is positive in order for conduction to occur in either tube section. If the temperature sensed by the tailpipe thermocouples is exactly equal to the calibration of the unit, there will be no amplifier signal and neither section of V3 will conduct. Let it be assumed that the secondary T5C of magnetic amplifier T3 is connected to produce positive plate voltages on section V3A of tube V3 during the period the grid voltage of the same section is going positive on an overtemperature signal (thermocouple temperatures greater than calibration temperature). Under these conditions, section V3A will conduct an average direct current through winding T3A, and with undertemperature signals, section V3B will conduct an average direct current through winding T3D. The magnetic amplifier T3 is represented schematically by six windings on two cores; its operation may be explained on the basis of two transformers having primary windings T3B, T3E, secondary windings T3C, T3F and control windings T3A, T3D. The two secondary windings are connected series bucking to the variable phase windings 71 of the servomotor 39. With no direct current through the control windings T3A, T3D, the 115 volt supply is divided equally across the primary windings T3B, T3E, the secondary voltages cancel each other and the variable phase winding 71 has no applied voltage. Upon the occurrence of overtemperature condition, the conduction of an average direct current through the control winding T3A will tend to saturate the core, which reduces the primary impedance of the transformer. Since the 115 volt supply is divided between the two transformer primaries T3B, T3E in direct proportion to their primary impedances, the secondary voltage developed in T3F will exceed the voltage developed in T3C and the resulting difference is applied to the variable phase winding 71 of motor 39. In a similar manner, an undertemperature condition produces a control voltage, but the latter will be 180° out of phase with the overtemperature voltage. The 180° phase reversal in the voltage applied to the variable phase winding reverses the motor torque.

The error rate circuit is designed to produce an alternating current signal with an amplitude proportional to the rate of change of the error signal; it includes transformer T4 to which is applied the thermocouple voltage modulated by chopper K1, first section of amplifier tube V4, cathode follower in the first section of tube V5, rectifier section in the second section of tube V5, two-section filter network including C11, R40, C12A, R41 and C12B, rate-sensitive circuit C13, R43 and R48, and mechanical modulator or chopper K3. The alternating current signal is conducted to the first section of V4 from the secondary of T4, where it is amplified and then the amplified signal rectified by the second half of V5. The rectified signal is then filtered by C11, R40, C12A, R41, C12B. The filtered direct current voltage across R42 will vary in magnitude in direct proportion to tailpipe temperature. The first section of V5 functions as a cathode follower which provides the required low impedance source for the rectifier at a signal level nearly equal to that in the high impedance amplifier circuit of V4. The intermediate (rectifying and filtering) step to an alternating current signal permits stable amplification at a high level without power supply variation effects on the rate signal. The rate-sensitive circuit (C13, R43 and R48) output, which is approximately proportional to the rate of change in the direct current voltage across R42, is modulated by chopper K3, which shorts out R48 at the line frequency. The resultant alternating current signal is added to the error signal in tube V1 through the mixing action of resistor R3.

A small rate generator 82 is connected to the shaft of the motor 39 and provides a 400 cycle correction rate signal which is fed back into the mixer amplifier tube V1 through capacitor C8, potentiometer R34, R33, the second section of tube V4, R8 and R7. The field winding of the generator is supplied with excitation voltage from the 115 volt, 400 cycle input. The generated voltage is directly proportional to the r.p.m. of the actuator motor 39, and its phase relationship to the excitation voltage is a function of the direction of motor rotation. In actual practice, the generator 82 is enclosed within the case of the actuator motor and would not be visible in FIGURE 2. The correction rate signal feedback into the amplifier slows down the correcting action of the actuator bullet or valve 16 of FIGURE 2 as the tailpipe temperature approaches the calibration temperature of the amplifier and minimizes control correction overshoot; its action is analogous to that of a dashpot in that it achieves control stability by reducing the control's correction speed without affecting the sensitivity or actuating forces of the control under stall conditions.

A speed switch and relay circuit is indicated at 85; it includes an engine driven speed switch 86, which is shown in the form of a governor 86' adapted to separate a pair of spring-pressed contacts 87 and 88 when the engine speed attains a predetermined value. Also, in the circuit 85 is an arming relay K2, provided with an armature 89, which is connected to a switch 90. As shown, switch 90 is of the normally closed type, that is, it is urged into engagement with a contact 91 by a spring 92 when the relay coil is unenergized; and when said coil is energized, switch 90 is moved into engagement with a contact 93. With switch 90 in engagement with contact 91 (engine speeds in excess of a predetermined value), the variable phase winding 71 of motor 39 is connected to the secondaries T3F and T3C of the magnetic amplifier or saturable reactor T3. When switch 90 is in engagement with contact 93 (engine speeds below a predetermined value), the said variable phase winding 71 is connected to the 115 volt supply. The manner in which these respective switch positions affect the operation of the system will be explained in the description of operation, which follows.

*Operation*

It is assumed that the control is to be used with a fuel feed device having an adjustable speed governor-type fuel or throttle valve which will automatically maintain a steady engine speed for a given throttle or power lever setting. The curve chart of FIGURE 6 further assumes that the fuel feed through the throttle valve metering restriction is automatically regulated as a function of engine speed during, for example, an acceleration of the engine.

In the position of the various parts as shown in FIGURES 1, 2 and 3, the power lever 18 is at a part-throttle setting, the throttle cam 52 of FIGURE 2 is in its ineffective range of movement with respect to follower rod 51, the bullet valve 16 gives maximum jet area, and speed switch 86 is closed so that relay switch 90 is against contact 93 and the voltages supplied to the field windings 70 and 71 of the actuator motor 39 are in such phase relationship as will hold the one end of the stop arm 42 against the overtemperature stop 44. Also, the cam 37 is holding the servo valve pistons 30 and 31 in their extreme left-hand positions so that annular recesses 32 and 33 are open and high pressure fluid or oil is being vented to that side (bottom side in FIGURE 2 or right-hand side in FIGURE 1) of the actuator piston 25 which is effective to hold the bullet valve 16 in its maximum area position. This is the "unarmed" position of cam 37.

Figure 6:
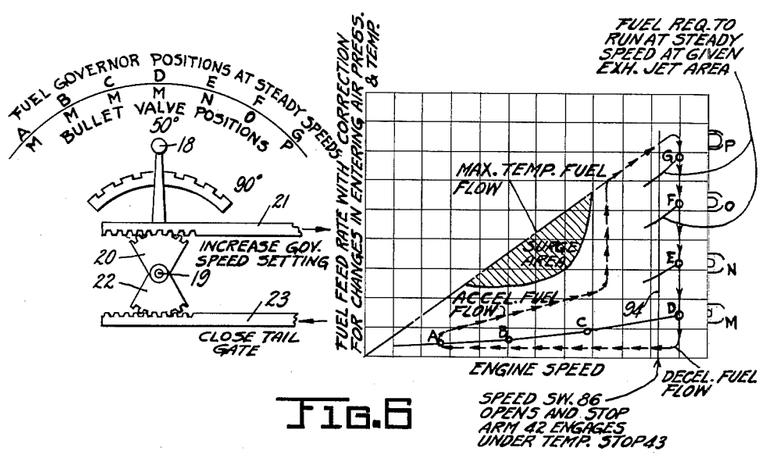
FIGURE 6 is a curve chart illustrating the operation of the control.

If now the pilot should move the power lever 18 from part-throttle to maximum power position (extreme right) to accelerate from point A to G in FIGURE 6, the adjustable speed fuel governor spring (not shown) would be reset and the throttle valve begin to open. With an exhaust jet area as at M, it requires only a relatively slight increase in the fuel feed rate to accelerate from A to a point beyond the surge area, since the drop across the turbine is at a maximum.

With the throttle or power lever 18 set at maximum power position, the speed switch 86 open, and engine temperature below a predetermined safe value, cam 37 rotates to the position shown in dotted lines in FIGURE 2 and arm 42 engages the undertemperature stop 43. Thottle cam 52 will then have been rotated clockwise and will, under these conditions, be effective to move servo valve pistons 30 and 31 to the right and vent high pressure fluid or oil to the area-reducing side (top side in FIGURE 2 or left-hand side in FIGURE 1) of the actuator piston 25' by way of port 35 and oil line 26. The bullet valve 16 will then move to the minimum area or maximum thrust position at G. This reduction in area of the exhaust jet decreases the drop across the turbine (back pressure rise), and were it not for the fuel control governor action on the fuel valve, the engine would slow down. However, the governor now calls for a sharp increase in fuel to establish the speed selected by the setting of the power lever 18, and the acceleration fuel increases to approximately the maximum temperature limit, viz. a temeprature which may be maintained only temporarily or just during acceleration and follows the maximum temperature line to where governor cut-off begins, whereupon it decreases to stead-speed operating point G.

The pilot is at liberty to reset the throttle or power control lever from idle or low power to maximum power position suddenly or in one motion without danger of bringing about an overtemperature condition. This is so, since in order for the bullet valve 16 to close, (*a*) the speed switch 86 must be open, and (*b*) the turbine temperature must be below a predetermined safe value. As the throttle or power lever 18 moves through the 90° position, cam 52 acts through rod 51 and lever 48 to move cam 37 to the right, but if the speed switch is closed, cam 37 will remain in its full-line position and will have moved valve pistons 30 and 31 to the left a distance such that the cam 52 becomes ineffective to move said pistons sufficiently far to the right to open port 35 to high pressure oil or fluid. As long as the speed switch remains closed, the variable phase winding 71 is energized by 400 cycle supply voltage and the phase relationship between windings 70 and 71 is such as will cause the motor to maintain the contact end 42' of arm 42 against the overtemperature stop 44 (full line position of cam 37), at which point the motor stalls. When the speed switch opens, the variable phase winding 71 is energized through the amplifier. If now the temperature is at 1250° F., the motor torque is such as to just balance out the opposed force of spring 41 and the contact end 42' of arm 42 remains against stop 43, but if the temperature rises above 1255° F., the amplifier puts out a signal to the variable phase winding which is proportional to the degree and rate of temperature rise, and the motor 39 rotates cam 37 to some intermediate position, thereby moving servo valve pistons 30 and 31 to the left and causing hydralic motor piston 25' to move upwardly and increase the exhaust jet area. As the area increases, two things happen simultaneously: the follow-up mechanism, including worm 61 and shaft 62, starts to recenter the valve pistons 30 and 31 and the temperature drop reduces the voltage to the motor 39, causing the motor cam 37 to rotate such that it also starts to recenter the valve pistons. As long as the overtemperature condition exists, the nozzle area increases until an area is reached where the turbine temperature is 1255° F. When this temperature is reached, the amplifier output is reduced, the pilot valve pistons have centered, movement of power piston 25' has stopped, and the jet nozzle area arrived at is maintained.

Resuming the description of operation in conjunction with FIGURE 6, as the speed of the engine increases to the point indicated by the vertical line 94, speed switch 86 opens, the relay coil of K2, FIGURE 3, is de-energized and spring 92 moves switch 90 into engagement with contact 91. The amplifier now supplies voltages in such phase relationship to the field windings 70 and 71 of motor 39 as will cause the motor to rotate arm 42, FIGURE 2, against the undertemperature stop 43. The actuator is now "armed" and the pilot has complete control of bullet valve position by moving lever 18 within a range of say, 52° to 90°, subject, however, to being overriden by the temperatures responsive amplifier in the event of a rise in turbine or tailpipe temperature above a predetermined value with the bullet valve in a partially closed position. This upper temperature limit is the calibration or set temperature of the amplifier, and should this be exceeded, the field windings of motor 39 will be supplied with voltages in such phase relationship as will cause the motor armature or shaft 42 to rotate clockwise, rotating cam 37 in a direction to move servo valve pistons to the left and vent high pressure fluid to the underside of actuator piston 25' and venting the opposite side thereof to drain. The exhaust jet area will then be increased until the turbine or tailpipe temperature equals the amplifier set temperature. A rise in turbine or tailpipe temperature (more briefly expressed as engine changes in altitude, ambient air temperature and other factors varying with any one of its given positions), the follow-up cam 58 of FIGURE 2 will have centered or balanced the servo valve pistons 30 and 31, and power piston 25' will then be held against further movement until the pilot valve pistons are again displaced through rotation or axial movement of cam 37.

Should the pilot decelerate as indicated by the dotted arrow line in FIGURE 6, cam 52 will be rotated counterclockwise back to the position shown in FIGURE 2 and the spring-pressed follower rod 51 will move to the left, causing servo valve 28 to move power piston 25' in a direction to retract the bullet valve 16.

Should there be an electrical power failure, the spring 41 will cause the end 42' of arm 42 to engage the undertemperature stop 43 and move cam 37 to the dotted line position. This action will cause the pilot or servo valve pistons to move to the right such distance as will open the upper side of power piston 25' to pressure and the lower side to drain and effect a reduction in exhaust jet area to a point where full engine thrust or power may be developed through operation of the pilot's control lever or by variation in the rate of fuel feed.

To summarize the operation:

(a) At engine speeds below speed switch setting, speed switch 86 is closed, switch 90 of relay K2 is against contact 93 and the motor 39 is energized by a fixed phase voltage and the 400 cycle supply voltage. This causes the motor to rotate stop arm 42 with the end 42' thereof against overtemperature stop 44. Motor cam 37 is then in the full line position, holding pilot valve 28 open so that pressure fluid is vented to the rod side of power piston 25' and the bullet valve 16 fully retracted (maximum jet area). These conditions are maintained for power lever positions from, say zero to 52°, although, as heretofore noted, during acceleration the power lever can be moved to full thrust position and the speed switch will still remain closed until the speed attains a predetermined value.

(b) At engine speeds above setting of switch 86 and power lever positions above 52°, the said switch opens and the variable phase of motor 39 is energized through the amplifier of FIGURE 3. If engine temperature is at or below the upper limit (amplifier set temperature) the motor cam 37 turns to the dotted line position with the end 42' of arm 42 against undertemperature stop 43, throttle cam 52 has caused pilot valve 28 to open the hydraulic pressure line 26 to the upper side of the power piston 25', and bullet valve 16 moves toward closed or minimum jet area position. As said valve 16 moves in its area decreasing direction, it acts through follow-up shaft 62, cam 58 and rod 50, to return pilot valve pistons 30 and 31 to centered position when the selected nozzle area is reached.

(c) Should the engine temperature exceed the set temperature, the amplifier puts out a signal to the variable phase winding 71 of motor 39 which is proportional to the amount and rate of temperature rise; whereupon said motor rotates cam 37 to some intermediate position, followed by movement of pilot valve pistons 30 and 31 to the left and retraction of bullet valve 16. As bullet 16 retracts, follow-up cam 58 starts to recenter the servo valve pistons and the drop in temperature resulting from an increase in jet area reduces the voltage to motor 39, whereupon motor cam 37 is rotated in a direction such that it also starts to recenter the said servo valve pistons. As long as an overtemperature condition exists, jet nozzle area will increase until an area is reached where the engine temperature equals the amplifier set temperature. When this temperature is reached, pilot valve pistons 30 and 31 will have centered and further movement of power piston 25' is stopped.

Although only one embodiment of the invention has been illustrated and described, various changes in form and relative arrangement of parts may be made to suit requirements.

We claim:

1. In a power control system for a turbojet engine having an exhaust jet, valve means for varying the effective area of the jet, a hydraulic actuator for said valve means, a servo valve for said actuator, a power control member movable between minimum and maximum power positions, means operatively connecting said member to said servo valve in a manner such that over a range of movement of said member between a minimum power setting up to a given higher power setting the servo valve positions the actuator to maintain a substantially scheduled maximum jet area and from such given higher setting to a yet higher power setting said member becomes effective to adjust the servo valve to cause the actuator to move the valve means in a direction to reduce the area of the jet, an electric servomotor, means operatively connecting said servomotor to said servo valve for adjusting the latter including means for overriding control of the servo valve by said member, and electrical means for energizing said servomotor including a device for establishing a signal representing deviations in engine temperature from a predetermined value, means responsive to a signal indicating engine temperature below said predetermined value for rendering the servomotor ineffective to override control of the servo valve by said member and means responsive to a signal indicating temperatures above such value for rendering the servomotor effective to override such control and adjust the servo valve in a direction to produce an increase in the area of the jet.

2. In a power control system for a turbojet engine having an exhaust jet, valve means for varying the effective area of the jet, an adjustable control device operatively connected to said valve means, a power control member operatively connected to said device for varying the effective area of the jet, an electric servomotor having an energizing circuit, an electric circuit for energizing said servomotor circuit including a device for establishing a signal in response to changes in engine temperature, means connecting said motor to said control device to override control by said control member and increase jet area in the event engine temperature exceeds a predetermined value, and means for positioning said control device for full control of jet area by said control member in the event the electric power supply should fail and said servomotor stall at a position which would interfere with the action of said control device.

3. In a power control system for a turbojet engine having an exhaust jet, valve means for varying the effective area of the jet and an adjustable control device for said valve means, control means operatively connected to said control device for controlling the area of the jet, an electric servomotor, means operatively connecting said servomotor to said control device for adjusting the latter and connected to override control by said control means, and electrical means for energizing said servomotor including a device for establishing a signal representing deviations in engine temperature from a predetermined value, means responsive to a signal indicating engine temperatures below said predetermined value for rendering the servomotor ineffective to override control through said control means, means responsive to a signal indicating temperatures above said predetermined value for rendering said servomotor effective to override said control means and drive the servomotor in a direction to produce an increase in the area of the jet, said electrical means producing a signal such that at engine speeds below a predetermined value said servomotor tends to adjust said control device to produce a maximum jet area and including means responsive to engine speed for conditioning or "arming" the servomotor circuit so that it responds to overtemperature signals.

4. In a power control system for a turbojet engine having an exhaust jet, hydraulic motor means for varying the effective area of the jet, valve means for controlling said hydraulic motor means, a power actuator for said valve means and an adjustable control device for said actuator, a power control member movable between minimum and maximum power positions, means operatively connecting said member to said control device in a manner such that over a range of movement of said member between a minimum power setting up to a given higher power setting the control device governs the actuator to maintain a substantially maximum scheduled jet area and from such given higher setting to a yet higher power setting said member becomes effective to adjust said control device to cause the actuator to move said valve means in a direction to reduce the area of the jet, an electric servomotor and means operatively connecting said servomotor to said control device for adjusting the latter including means connected to override control by said member, and electrical means for energizing said servomotor including a device for establishing a signal representing deviations in engine temperature from a predetermined value, means responsive to a signal indicating engine temperatures below said predetermined value for rendering the servomotor ineffective to override control by said member, and means responsive to a signal indicating temperatures above said predetermined value for rendering said servomotor effective to override control by said member and adjust said control device in a direction to produce an increase in the area of the jet, said electrical means producing a signal such that at power member positions below said intermediate power setting and at engine speeds below a predetermined value said servomotor tends to adjust said control device to produce a maximum jet area and including means for conditioning or "arming" the servomotor circuit so that it responds to temperature signals only at engine speeds above a predetermined value.

5. In a fuel feed and power control system for a turbojet engine having an exhaust jet and means for varying the effective area of the jet, a fuel metering device having a control element for selectively varying the rate of fuel feed, a hydraulic motor for positioning said area varying means, a hydraulic servo valve connected to said hydraulic motor, a lever operatively connected to said hydraulic servo valve, means including a cam connecting said control element to said lever, a member positioned by said hydraulic motor operative to supply a feedback signal to said lever, an electric servomotor, means operatively connecting said servomotor to said hydraulic servo valve for adjusting the latter and connected to actuate said servo valve independently of said control element, and electrical means for energizing said servomotor including a device for establishing a signal representing deviations in engine temperature from a predetermined value, means responsive to a signal indicating temperatures above said predetermined value for rendering said servomotor effective to override said control means and drive the servo valve in a direction to produce an increase in the area of the jet.

6. In a fuel feed and power control system for a turbojet engine having an exhaust jet and means for varying the effective area of the jet, a fuel metering device having a manually operated control element for selectively varying the rate of fuel feed, a hydraulic motor for positioning said area varying means, a hydraulic servo valve effective to control said hydraulic motor means, means responsive to movement of said control element for producing a shaft rotation, means responsive to movement of said area varying means for producing a shaft rotation, mechanical signal combining means connected to receive as input signals the shaft rotation from each of said control element responsive means and said area varying means operatively connected to said hydraulic servo valve, engine temperature sensing means, and power means controlled by said temperature sensing means and operatively connected to said servo valve to control said area varying means over substantially its entire range of movement independently of said control element in the event engine temperature exceeds a predetermined value.

7. In a power control system for a turbojet engine having an exhaust jet and means for varying the effective area of the jet, a manually operated control element, a hydraulic motor for positioning said area varying means, a hydraulic servo valve effective to control said hydraulic motor, means responsive to movement of said control element for producing a shaft rotation, means responsive to movement of said area varying means for producing a shaft rotation, mechanical signal combining means connected to receive as input signals the shaft rotation from each of said control element responsive means and said area varying means and operatively connected to said hydraulic servo valve, engine temperature sensing means, and power means controlled by said temperature sensing means and connected to control said area varying means over substantially its entire range of movement independently of said control element in the event engine temperature exceeds a predetermined value.

8. In a fuel feed and power control system for a turbojet engine having an exhaust jet and means for varying the effective area of the jet, a fuel metering device having a control element for selectively varying the rate of fuel feed, a hydraulic motor for positioning said area varying means, a hydraulic servo valve effective to control said hydraulic motor, means responsive to movement of said control element for producing a shaft rotation means responsive to movement of said area varying means for producing a shaft rotation, mechanical signal combining means connected to receive as input signals the shaft rotation from each of said control element responsive means and said area varying means and operatively connected to said hydraulic servo valve, an electric servomotor and an electric circuit for energizing said servomotor including a device for establishing a signal in response to changes in engine temperature, means operatively connecting said servomotor to said hydraulic servo valve to override control by said control element and increase jet area in the event engine temperature exceeds a predetermined value, and means for positioning said hydraulic servo valve for full control of jet area by said control element in the event the electric power supply should fail.

9. In a power control system for a turbojet engine having an exhaust jet and means for varying the effective area of the jet, a hydraulic motor for positioning said area varying means, a hydraulic servo valve effective to control said hydraulic motor means, manual means and means responsive to movement of said manual means for producing a shaft rotation, means responsive to movement of said area varying means for producing a shaft rotation, mechanical signal combining means connected to receive as input signals and shaft rotation from each of said manual means and said area varying means and operatively connected to said hydraulic servo valve, an electric servomotor, means operatively connecting said servomotor to said hydraulic servo valve for adjusting the latter and arranged to override control by said manual means, and electrical means for energizing said servomotor including a device for establishing a signal representing deviations in engine temperature from a predetermined value and means responsive to a signal indicating temperatures above said predetermined value for rendering said servomotor effective to override said manual means and drive the servomotor in a direction to produce an increase in the area of the jet.

10. In a power control system for a turbojet engine having an exhaust jet and means for varying the effective area of the jet, a fuel metering device having a control element for selectively varying the rate of fuel feed, a hydraulic motor for positioning said area varying means, a hydraulic servo valve effective to control said hydraulic motor means, means responsive to movement of said control element for producing a shaft rotation, means responsive to movement of said area varying means for producing a shaft rotation, mechanical signal combing means connected to receive as input signals a shaft rotation from each of said control element responsive means and said area varying means operatively connected to said hydraulic servo valve, an electric servomotor, means operatively connecting said servomotor to said servo valve for adjusting the latter and capable of controlling said area varying means over substantilaly its entire range of movement independently of said control element, and electrical means for energizing said servomotor including thermocouple means exposed to the combustion temperautres in the tailpipe of said engine, a bridge circuit for producing a temperature error signal having said thermocouple means connected thereacross including a resistor having a variable temperature coefficient for providing cold junction compensation for said thermocouple means, and amplification means for said temperature error signal including a magneitc amplifier connected to said servomotor for rendering said servomotor effective to override said control element.

11. In a system for controlling operating temperatures in a gas turbine engine, means effective to vary said operating temperatures, an electric motor having a variable phase winding and a fixed phase winding connected to said varying means, and thermocouple means for sensing said operating temperatures: an amplifying system for converting the output of said thermocouple means into a driving signal for said electric motor comprising a bridge circuit for producing a temperature error signal having said thermocouple means connected thereacross and including a variable resistance device for establishing a temperature reference, a resistor having a variable temperature coefficient for providing cold junction compensation for said thermocouple means, a chopper connected to the output of said bridge circuit for modulating said temperature error signal, a coupling transformer having its primary winding connected to said chopper, an alternating current amplifier connected to the secondary winding of said transformer for amplifying said temperature error signal, a damping generator driven by said electric motor and connected to said amplifier for providing a stabilizing signal thereto, a phase-sensitive demodulator connected to receive the output signal from said amplifier and for converting the output signal into a direct current signal, a saturable reactor connected to the output of said demodulator for further amplifying said signal, and means connecting said saturable reactor to the variable phase winding of said electric motor.

12. In a system for controlling operating temperatures in a gas turbine engine including means effective to vary said operating temperatures, an electric motor having a fixed phase winding and a variable phase winding for driving said varying means, and thermocouple means for sensing said operating temperatures: an amplifying device for converting the output of said thermocouple means into a driving signal for said electric motor comprising a bridge circuit for producing a temperature error signal having said thermocouple means connected thereacross and including a variable resistance device for establishing a temperature reference and cold junction compensating means for said thermocouple means including a resistor having a variable temperature coefficient, an alternating current amplifier for amplifying said temperature error signal, a damping generator driven by said motor and means connecting the output of said generator to said amplifier, a phase-sensitive demodulator connected to receive the output signal from said amplifier and for converting said output signal into a direct current signal, a saturable reactor for receiving said direct current signal and for further amplifying said signal, and means connecting said saturable reactor to the variable phase of said electric motor.

13. In a system for controlling operating temperatures in a gas turbine engine including means effective to vary said operating temperatures, an electric motor having a fixed phase winding and a variable phase winding for driving said varying means, and thermocouple means for sensing said operating temperatures: an amplifying device for converting the output of said thermocouple means into a driving signal for said electric motor comprising a regulated direct current voltage source, a bridge circuit for producing a temperature error signal connected to said source having said thermocouple means connected thereacross including a variable resistance device for establishing a temperature reference and cold junction compensating means including a resistor having a variable temperature coefficient, a chopper for modulating the output signal of said bridge circuit, an alternating current amplifier for amplifying said modulated signal, a damping generator driven by said motor and means connecting the output of said generator to said amplifier, a phase-sensitive demodulator connected to receive the output signal from said amplifier and for converting said output signal into a direct current signal, a saturable reactor for receiving said direct current signal and for further amplifying said signal, and means connecting said saturable reactor to the variable phase of said electric motor.

14. In a system for controlling operating temperatures in a gas turbine engine including means effective to vary said operating temperatures, an electric motor having a fixed phase winding and a variable phase winding for driving said varying means, and thermocouple means for sensing said operating temperatures: an amplifying device for converting the output of said thermocouple means into a driving signal for said electric motor comprising a bridge circuit for producing a temperature error signal having said thermocouple means connected thereacross and including means for establishing a temperature reference and cold junction compensation means for said thermocouple means including a resistor having a variable temperature coefficient, means for modulating the output of said bridge, an alternating current amplifier for amplifying said modulated signal, a damping generator driven by said motor and means connecting the output of said generator to said amplifier, a saturable reactor connected to said electric motor, and means including a demodulator connecting the output signal of said amplifier to said saturable reactor.

15. In a system for controlling operating temperatures in a gas turbine engine, means effective to vary said operating temperatures, and a two-phase electric motor operatively connected to said varying means: amplification means connected to said electric motor including a phase-sensitive saturable reactor for driving said electric motor, means producing an input signal to said amplification means including a bridge circuit with a thermocouple connected thereacross, a variable resistor for establishing a temperature reference and cold junction compensating means for said thermocouple means connected in said bridge circuit including a resistor having a variable temperature coefficient, an alternating current amplifier for amplifying said input signal, a damping generator connected to said electric motor and means connecting the output of said generator to said amplifier, and a phase-sensitive demodulator connected to receive the output signal of said amplifier and for converting said output signal to a direct current signal and means connecting said direct current to said saturable reactor.

16. In a system for controlling operating temperatures in a gas turbine engine, means effective to vary said operating temperatures, and electric motor means operatively connected to said varying means: amplification means connected to said motor means including a phase-sensitive saturable reactor for driving said motor means, means producing an input signal to said amplification means including a bridge circuit and a thermocouple connected thereacross, a variable resistor for establishing a temperature reference and cold junction compensating means for said thermocouple means connected in said bridge circuit including a resistor having a variable temperature coefficient, an alternating current amplifier for amplifying said input signal, a damping generator connected to said electric motor and means connecting the output of said generator to said amplifier, and a phase-sensitive demodulator connected to receive the output signal of said amplifier and for converting said output signal to a direct current signal and means connecting said direct current signal to said saturable reactor.

17. A system for controlling operating temperatures of a gas turbine engine as set forth in claim 16 wherein electric switching means are provided responsive to changes in the rotational speed of said engine for varying the output of said amplifying system.

References Cited in the file of this patent

UNITED STATES PATENTS

| | | |
|---|---|---|
| 2,564,127 | Orr | Aug. 14, 1951 |
| 2,610,614 | Sedgwick | Sept. 16, 1952 |
| 2,699,524 | Jackson et al. | Jan. 11, 1955 |
| 2,699,646 | Baker | Jan. 18, 1955 |
| 2,705,864 | Peters | Apr. 12, 1955 |
| 2,706,383 | Jacobson | Apr. 19, 1955 |
| 2,713,767 | Alford et al. | July 26, 1955 |
| 2,734,340 | Wood | Feb. 14, 1956 |
| 2,776,536 | Chudyk | Jan. 8, 1957 |
| 2,794,424 | May | June 4, 1957 |
| 2,958,186 | Mock | Nov. 1, 1960 |
| 2,962,911 | Perkey | Dec. 6, 1960 |

FOREIGN PATENTS

| | | |
|---|---|---|
| 947,534 | Germany | Aug. 15, 1956 |